2 Sheets—Sheet 1.
P. MALTBY.
Revolving-Oven.
No. 206,466. Patented July 30, 1878.
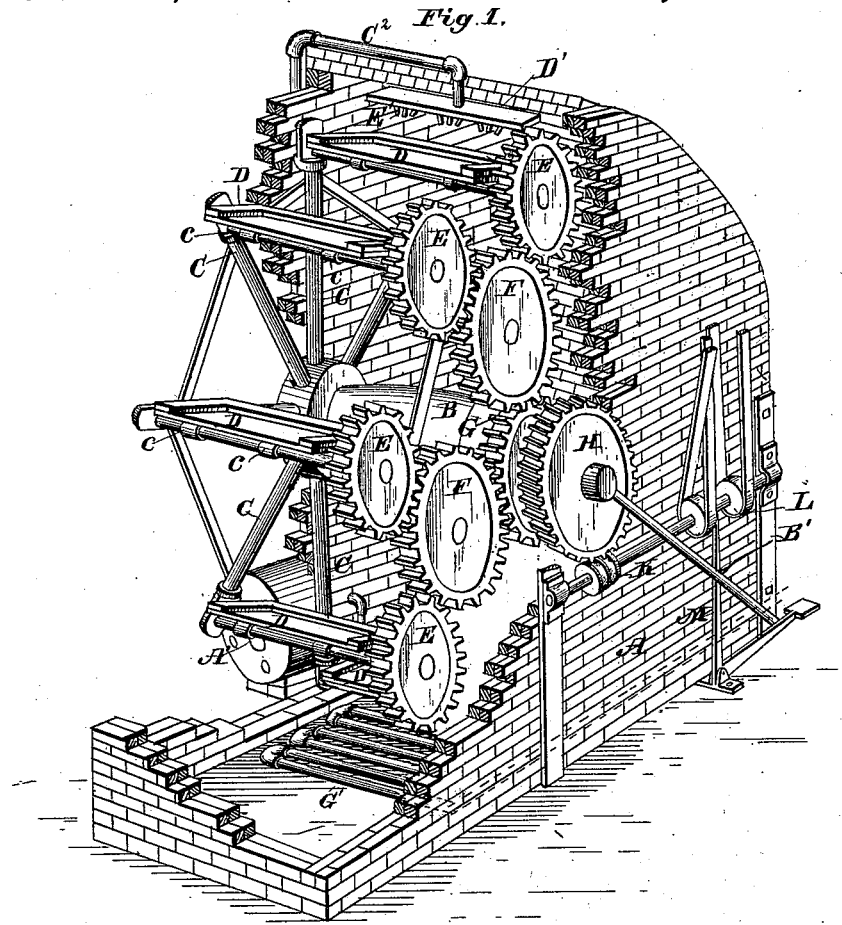
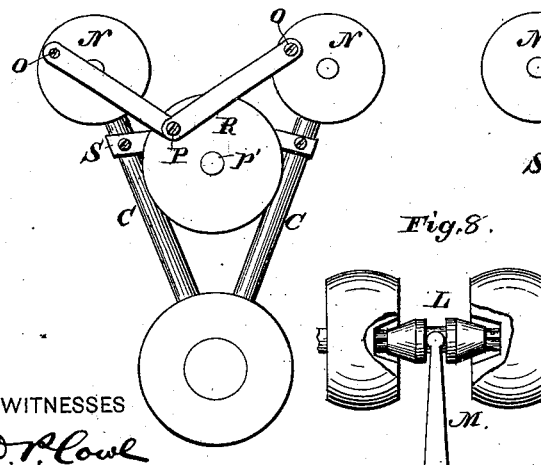
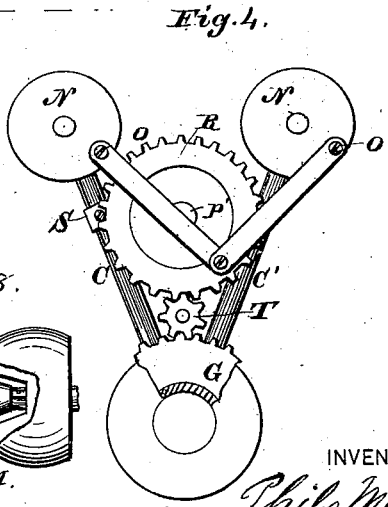
WITNESSES
D. P. Cowl
D. Bacon
INVENTOR
Philo Maltby
per J. R. Nottingham
ATTORNEY 2 Sheets—Sheet 2.
P. MALTBY.
Revolving-Oven.
No. 206,466. Patented July 30, 1878.
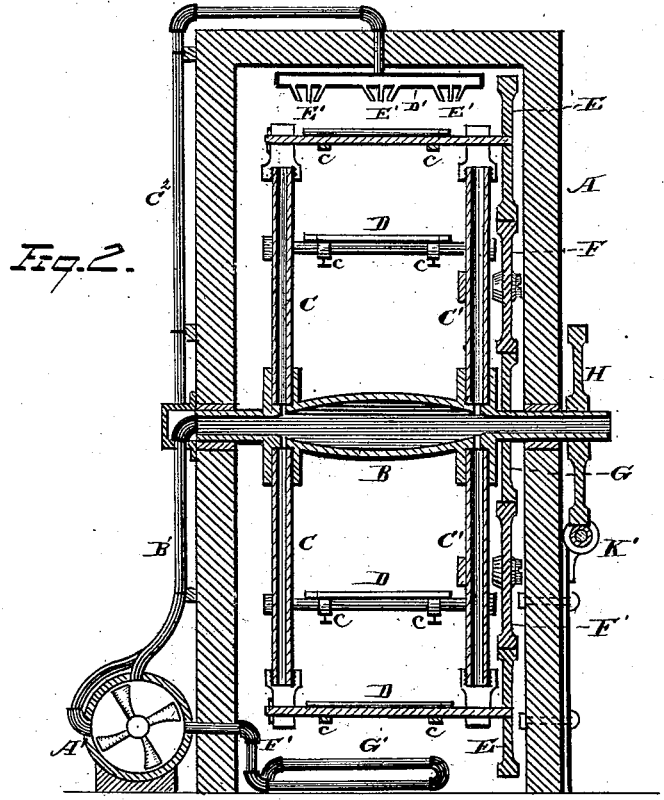
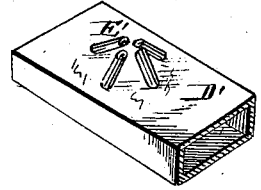
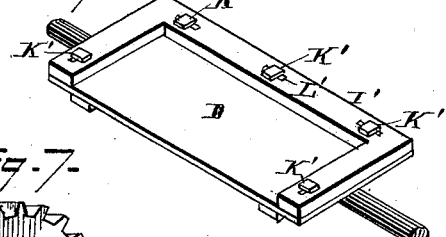
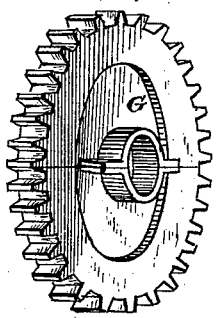
WITNESSES
D. P. Cowl
L. Bacon
INVENTOR
Philo Maltby
per J. R. Nottingham
ATTORNEY
N. PETERS, PHOTO-LITHOGRAPHER, WASHINGTON, D. C.

UNITED STATES PATENT OFFICE.

PHILO MALTBY, OF CLEVELAND, OHIO.

IMPROVEMENT IN REVOLVING OVENS.

Specification forming part of Letters Patent No. 206,466, dated July 30, 1878; application filed July 6, 1878.

*To all whom it may concern:*

Be it known that I, PHILO MALTBY, of Cleveland, in the county of Cuyahoga and State of Ohio, have invented certain new and useful Improvements in Revolving Ovens; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to certain improvements in bakers' ovens; and it has for its object to uniformly subject the whole amount of dough to be baked to the action of the heat in the oven, by causing the pans containing the same to traverse the oven throughout during the baking, and also to provide a means for cooling the working parts of the oven during the operation of baking, and equalizing the heat in the same, as more fully hereinafter specified.

To this end my invention consists in providing the oven with a hollow rotating shaft, having a series of hollow radial arms at each end, between which are journaled a series of tables for carrying the dough, the shafts of which are operated by means of suitable gearing to keep the tables always in a horizontal position as the rotating shaft revolves, as more fully hereinafter specified.

My invention further consists in the combination, with the hollow shaft and its radial arms, and with the interior of the oven, of a blowing apparatus connected with the same by means of suitable pipes, whereby a current or currents of cold air or other fluid can be passed through the shaft, and into its arms and into the oven, for cooling the shaft and equalizing the heat in the oven, as more fully hereinafter set forth.

In the drawing, Figure 1 represents a perspective view of my improved oven, with the back broken away in order to show the interior of the same. Fig. 2 represents a vertical transverse section through the same. Figs. 3 and 4 represent detached views of modifications of the gearing for keeping the tables in a horizontal position. Fig. 5 represents a detached perspective view of a portion of the air pipe or chamber for distributing air to the upper part of the oven, showing the arrangements of its jets. Fig. 6 represents a detached view of one of the tables; Fig. 7, a detached view of the main gear-wheel by means of which the driving-gearing of the tables is put in motion; and Fig. 8 represents a detached view of a friction-clutch for stopping and reversing the motion of the reel.

The letter A represents the walls of the furnace, which may be of any approved construction. The letter B represents a horizontal hollow shaft, journaled in suitable bearings in opposite sides of the furnace. Said hollow shaft is enlarged at its center, in order to increase its strength, as clearly shown in Fig. 2. Said shaft, near each end, is provided with a series of hollow radial arms or spokes, C C'. Between each set of arms C and C' is journaled an adjustable shelf or table, D, upon which the pans or trays containing the dough to be baked are supported. Said shelf or table D is secured to its shaft by means of a bearer or bearers, c, and is held in any position by means of a set-screw, the shaft being journaled in adjustable bearings.

The journals of the tables or shelves D project at one or both sides beyond their bearings, and are connected with gearing, by means of which they may be kept in a horizontal position as the shaft B and its arms or spokes are rotated.

The journals of each of the tables or shelves D are provided at one end with cog-wheels E, which intermesh with cog-wheels F mounted on the radial arms by means of the cross-piece. These in turn gear with a stationary toothed wheel, G, secured to the side of the oven or bearings in which the shaft B rotates. Said shaft B projects beyond its bearing at one end, and is provided with a gear-wheel, H, which intermeshes with a worm-screw, K, to which the power for driving the machinery is applied. Said worm-screw is provided with a friction-clutch, L, which is operated by a lever, M, extending to the floor, whereby the machinery may be instantaneously stopped and reversed when necessary.

In the modification shown in Figs. 3 and 4 the journals of the shelves or tables are provided with plain disks N at their ends, having crank-pins O, and connected to a crank-pin, P, on a similar disk, R, whose shaft $p'$ is journaled in bearings on cross-pieces S secured to the arms of the rotating shaft.

One of the disks R is toothed, and intermeshes with a pinion, T, journaled in a bearing on an arm extending downward, forming part of one of the cross-pieces S, and said pinion intermeshes with the stationary gear-wheel of the apparatus, and transmits the necessary motion to the disks and the tables or shelves as the main shaft is rotated.

The letter A' represents a rotary blower, connected with the hollow shaft of the apparatus by means of a pipe, B', by which means a current of cold air may be driven through said shaft and its hollow arms, in order to keep said parts cool and prevent injury to the same. The opposite end of said shaft may be provided with a pipe, by means of which the hot air may be conveyed to the furnace by which the oven is heated, or otherwise utilized.

The letter $C^2$ represents another pipe, extending from the blowing apparatus to the top of the oven, where it terminates in a transverse chamber, D', having a series of converging jet-tubes, E', by means of which cold air is supplied to the upper part of the oven in order to equalize the heat at that point.

The letter F' represents a pipe extending from the blower into the lower part of the oven. Said pipe traverses the bottom of the oven in the form of a coil, G'. The air therein, becoming heated, is then passed, by means of a pipe connected to G', under the grate, at the front, into the furnace, whereby a more intense heat is created, thereby causing a saving in the expense of fuel.

In order to provide for the insertion and removal of the stationary cog-wheel without removing the main shaft of the apparatus, said wheel is divided diametrically, or made in two parts, with fastening devices of any suitable description by which they may be secured in place around the shaft.

It has been found in practice that after a little use the table or shelves become warped. To prevent this, I provide an adjustable frame, I', Fig. 6, which may be secured to the edges of the tables by means of bolts K' passing through the slots L' in the frame.

The operation of my invention will be fully understood in connection with the above without further description.

I do not claim the trays or shelves operated by means of beveled gearing, as such an arrangement has heretofore been used; but as heretofore arranged, I find it impracticable to operate the required number of trays, and in old ovens it is found to be impossible to use beveled gearing on account of it taking up too much space in the width of the oven. The use of spur-gearing, or its equivalent device, as described, obviates these difficulties.

Having thus described my invention, what I claim, and desire to secure by Letters Patent, is—

1. In a baker's oven, the hollow shaft provided with tubular arms, and the shelves or tables for supporting the dough, substantially as specified.

2. In combination with the rotating shaft and its arms, the train of spur-gearing, and stationary gear-wheel for rotating the shelves or tables and keeping the same in horizontal position, substantially as specified.

3. In combination with the tables or shelves, the adjustable frame to prevent warping, substantially as specified.

4. The combination of the hollow main shaft, its tubular arms, the shelves or tables and their gearing, and the stationary gear-wheel, all constructed and arranged to operate substantially as specified.

5. In combination with the hollow shaft and its arms, a fan-blower connected therewith by means of a suitable pipe, whereby a current of air may be established through said shaft and into the arms, for the purpose of cooling the same, substantially as specified.

6. In combination with the oven, the fan-blower and jet-chamber in the upper part of the oven, substantially as and for the purpose specified.

7. In combination with the oven and blower, the coiled pipe in the lower part of the oven and connected to the blower, and the pipe passing to the front and under the grate into the furnace, thereby creating a more intense heat, substantially as specified.

In testimony that I claim the foregoing as my own I affix my signature in presence of two witnesses.

PHILO MALTBY.

Witnesses:
WILLIAM FITCH,
J. R. NOTTINGHAM.